Patented July 18, 1939

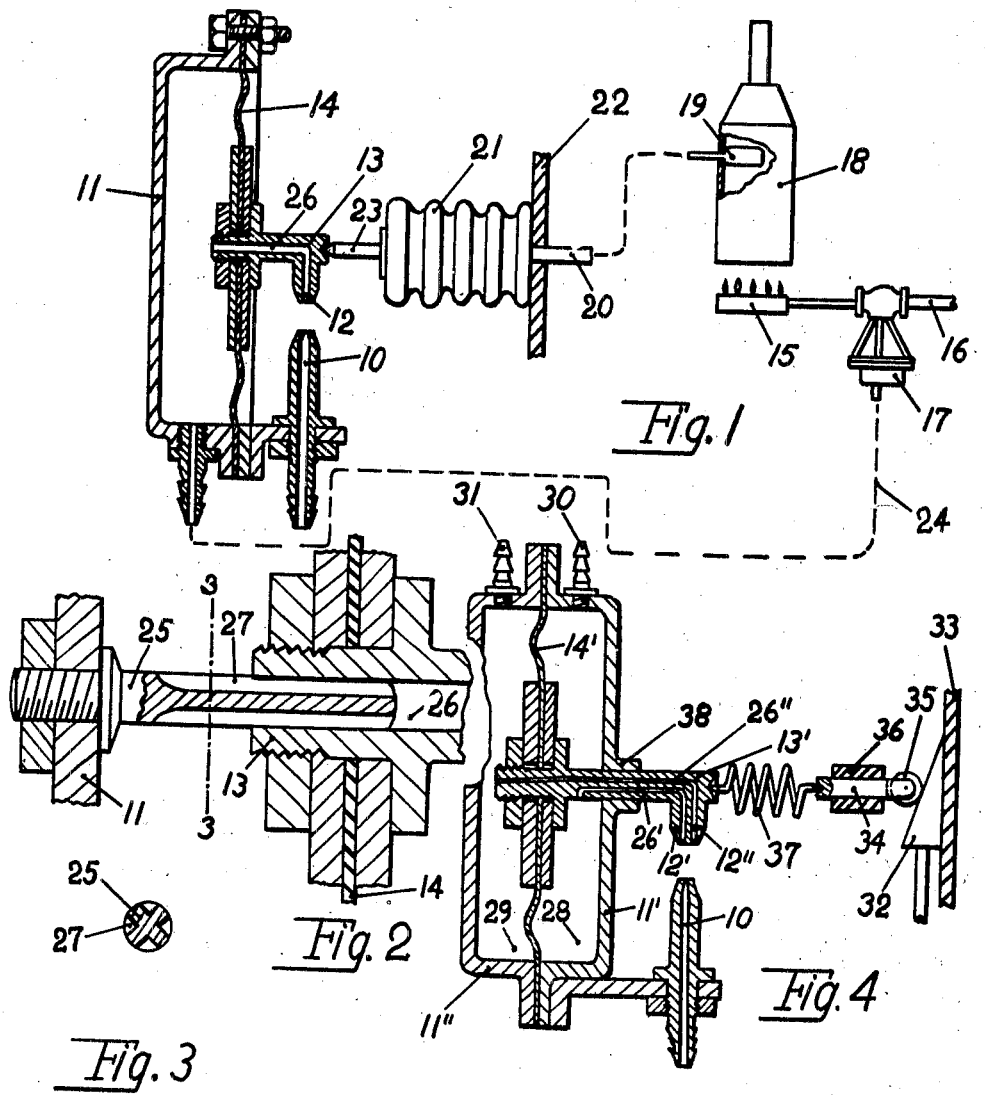

2,166,705

UNITED STATES PATENT OFFICE 2,166,705

FLUID PRESSURE RELAY

Alfred Hochschulz, Chicago, Ill., assignor to Askania-Werke A. G., a German company Application March 30, 1937, Serial No. 133,903

15 Claims. (Cl. 137—153)

This invention relates to fluid pressure relays.

Fluid pressure relays are used to convert a relatively small or weak impulse, which may be a force or a displacement, into a relatively strong pressure fluid impulse, such as a pressure.

One of the simplest and most effective types of relays is the well known "Askania" jet-type in which a movable pipe controlled in its position by a controlling impulse discharges a jet of pressure fluid into one or several reception orifices and thereby creates a pressure in the same depending on the degree in which the jet-pipe and the respective orifice or orifices register.

In order to apply practically no load to the controlling instrument the movable jet-pipe has to be properly balanced and mounted in delicate bearings. A further problem is the supply of pressure fluid to the jet-pipe through suitable inlets which operate without friction and a minimum loss of fluid and pressure.

It is an object of this invention to provide a relay of the jet-pipe type of simple and rugged construction. According to the present invention the jet-pipe is stationary, thereby obviating complicated bearings and supply inlets while the reception orifice is movable by means of an operative connection between the same and the movable part of a device responsive to the pressure set up in the orifice.

Further aims, objects and advantages will appear from a consideration of the description which follows with the accompanying drawing, showing embodiments of this invention for illustrative purposes. It is to be understood that the description is not to be taken in a limiting sense, the scope of the invention being pointed out in the accompanying claims.

Referring to the drawing:

Fig. 1 is a diagrammatic elevation, shown partly in section of a jet-pipe relay in a connection for controlling temperature.

Fig. 2 is an enlarged sectional illustration of a detail to be used in the relay of Fig. 1.

Fig. 3 is a section taken on line 3—3 of Fig. 2.

Fig. 4 shows a modified form of relay.

In Fig. 1 a discharge orifice member 10, in the description and claims called "jet-pipe", is mounted stationary relative to a diaphragm casing 11. The jet-pipe is supplied with pressure fluid, such as air, water or oil, from a suitable source (not shown). A jet of pressure fluid is discharged into a reception orifice 12 of a movable orifice member 13, setting up a pressure in the same depending on the degree in which the jet-pipe and the reception orifice register. The reception orifice communicates with a pressure responsive device, herein shown as consisting of the casing 11 and a movable diaphragm 14. The orifice member 13 is movable in response to the movements of the pressure responsive device, for example by virtue of its being mounted on the diaphragm 14.

The operation of the relay will now be explained in connection with its application to a temperature regulating apparatus shown in Fig. 1. A gas burner 15 is supplied with gas through a conduit 16 and the supply controlled by a diaphragm valve 17. A furnace 18 heated by the burner is equipped with a fluid thermostat bulb 19 connected by a line 20 with a bellows or Sylphon 21. In a well known way the Sylphon will expand and contract in response to temperature changes in the furnace.

The Sylphon mounted on a stationary part 22 is connected by means of a stem 23 to exert a controlling impulse, in this instance a force, on the relay by tending to displace the reception orifice member 13 relatively to the jet-pipe 10 to register in an increasing degree therewith. The pressure set up in the orifice and consequently inside the diaphragm casing 11 will increase, thereby exerting a restoring impulse on the orifice member 13. The restoring impulse or action tends to restore the relatively movable parts of the relay to a neutral position in which the relay is inactive. It is easily seen that a state of equilibrium will be established in this instance between the controlling and the restoring impulses in which the pressure inside the casing 11 is proportional to the force of the Sylphon or, in other words, the condition to be controlled. The pressure impulse of the relay is transmitted through a line 24 to the diaphragm valve 17 for controlling the supply of gas. If the temperature rises in the furnace the relay will act to move the valve 17 towards its closed position, thereby diminishing the supply of gas.

Experiments have shown that for normal operating conditions the tendency of the diaphragm 14 to assume a centered position is sufficient to center the reception orifice member. The reception orifice member will automatically assume a position in which so much pressure fluid is received as is necessary to create a restoring impulse for counter-balancing the controlling impulse.

If the relay is subjected to considerable vibrations, on a vehicle for example, it may be advantageous to provide a centering member for the reception orifice member. A suitable construction is shown in Fig. 2.

A guiding stud 25 is shown to be secured to the casing 11 partly to engage the conduit 26 leading from the orifice to the interior of the diaphragm chamber. In order not to interfere with an exchange of pressure between the orifice and the diaphragm chamber the stud is provided with longitudinal recesses 27 serving as a passage for pressure fluid. The stud is shown in cross section in Fig. 3.

A relay for creating differential pressure impulses is shown in Fig. 4.

The reception orifice member 13' is provided with two orifices 12' and 12" communicating through passages 26' and 26" with diaphragm chambers 28 and 29 formed by the diaphragm 14 and the casing 11', 11". Upon displacement of the orifice member to the left the pressure inside the chamber 29 will be increased and the pressure in chamber 28 decreased, whereby a differential pressure impulse is created which may be taken off at hose couplings 30 and 31.

The relay of Fig. 4 is shown to be actuated by a displacement impulse introduced by moving a cam 32 relatively to its support 33 and displacing a stem 34 provided with a roller 35 and guided at 36 for axial movement. The displacement of the cam is transmitted into a force of a spring 37 distorted thereby and connected to act on the relay.

A collar 38 in the casing 11' serves as a centering device, obviating any special device for this purpose.

It may be noted that a loss of pressure fluid due to a leakage of the diaphragm casing, for example at the collar 38, will not result in an inaccuracy of the relay, as the pressure fluid is automatically replaced by the action of the movable orifice member which is only at rest when a state of equilibrium is obtained between the controlling and restoring impulses.

Obviously the present invention is not restricted to the particular embodiments thereof herein shown and described. Moreover it is not indispensable that all the features of this invention be used conjointly since they may be employed advantageously in various combinations and subcombinations.

What is claimed is:

1. Fluid pressure relay comprising in combination, a hollow vessel having a movable wall; a stationary jet-pipe the jet issuing from same being substantially parallel to the wall; and a reception orifice member for receiving said jet, said reception member communicating with the interior of said vessel and connected to be moved with said wall transversely to said jet to register in a variable degree with said jet-pipe, whereby, upon a displacement of said orifice member transversely to said jet-pipe by an impulse, a pressure is set up within said vessel which is a function of the impulse.

2. Fluid pressure relay comprising, in combination, a pressure responsive device; a stationary jet-pipe; and a reception orifice member communicating with said pressure responsive device and connected to be moved therewith in a direction transverse to the jet issuing from said stationary jet pipe to register in a variable degree with said jet-pipe, whereby, upon a displacement of said orifice member transversely to said jet-pipe by an impulse, a pressure is created in said pressure responsive device which is a function of the impulse.

3. Fluid pressure relay comprising, in combination, a diaphragm chamber including a movable diaphragm; a stationary jet-pipe; the jet issuing from same being substantially parallel to said diaphragm and a reception orifice member for receiving said jet, said reception member communicating with said diaphragm chamber and connected to be moved with said diaphragm to register in a variable degree with said jet-pipe, whereby, upon a displacement of said orifice member transversely to said jet-pipe by an outside impulse, a pressure is set up within said diaphragm chamber which is a function of the impulse.

4. Fluid pressure relay comprising, in combination, a pressure responsive device; a stationary jet-pipe; a reception orifice member communicating with said pressure responsive device and connected to be moved therewith in a direction transverse to the jet issuing from said jet-pipe to register in a variable degree with said jet-pipe; and means to exert a controlling force on said orifice member, whereby, upon displacement of said orifice member transversely to said jet-pipe, a pressure is set up in said pressure responsive device which is a function of said controlling force.

5. Fluid pressure relay comprising, in combination, a pressure responsive device; a stationary jet-pipe; a reception orifice member for receiving the jet issuing from said jet-pipe, said reception member communicating with said pressure responsive device and connected to be moved therewith in a direction transverse to said jet to register in a variable degree with said jet-pipe; and means to exert a controlling displacement impulse on said orifice member, whereby upon displacement of said orifice member transversely to said jet-pipe, a pressure is set up in said pressure responsive device which is a function of said controlling displacement.

6. Fluid pressure relay comprising, in combination, a pressure responsive device; a stationary jet-pipe; a reception orifice member communicating with said pressure responsive device and connected to be moved therewith to register in a variable degree with said jet-pipe; a spring connected to act on said orifice member; and means for distorting said spring, whereby a displacement of said orifice member relatively to said jet-pipe is caused and a pressure set up in said pressure responsive device which is a function of the distortion of the spring.

7. Fluid pressure relay comprising, in combination, a differential pressure responsive device; a stationary jet-pipe; and an orifice member having two reception orifices and conduits communicating with said pressure responsive device, said orifice member being connected to be actuated by said differential pressure responsive device for the reception orifices to register in a variable degree with the said jet-pipe; whereby, upon a displacement of said member relatively to said jet-pipe, a differential pressure is created in the orifices which is a function of the displacement.

8. Fluid pressure relay comprising in combination, a differential pressure responsive diaphragm; a stationary jet-pipe; and an orifice member having two reception orifices, each connected to transmit fluid pressure to act on one side of said diaphragm, said orifice member being operatively connected to be displaced relatively to said jet-pipe by said diaphragm.

9. In a fluid pressure relay a stationary jet-pipe; a movable member having a reception orifice arranged to be moved transverse to the jet issuing from said jet-pipe; and a device responsive to the pressure set up in the reception orifice and connected to displace said member transversely to said jet-pipe.

10. In a fluid pressure relay a stationary jet-pipe; a movable reception orifice member having two orifices and arranged to be moved transverse to the jet issuing from said jet-pipe; and a device responsive to a differential pressure set up in the reception orifices and connected to displace said member transversely to said jet-pipe.

11. Fluid pressure relay comprising, in combination, a stationary jet-pipe; a movable member having a reception orifice arranged to be moved by an impulse transverse to the jet issuing from said jet-pipe; means connected to exert a controlling action on said member; and means responsive to the pressure set up in the reception orifice and connected to exert a restoring action on said member.

12. Fluid pressure relay comprising, in combination, a stationary jet-pipe; a movable member having two reception orifices, said member being arranged to be moved transverse to the jet issuing from said jet-pipe; means connected to exert a controlling action on said member; and means responsive to the differential pressure set up in the reception orifices and connected to exert a restoring action on said member.

13. Fluid pressure relay comprising, in combination, a diaphragm casing; a movable diaphragm mounted thereon to form a chamber therewith; a jet-pipe mounted stationary relatively to said casing the jet issuing from said jet-pipe being substantially parallel to said diaphragm; and a member mounted on said diaphragm to be movable therewith, said member having an orifice arranged to be moved transverse to said jet and a passage connecting said orifice with the interior of the chamber.

14. Fluid pressure relay comprising, in combination, a diaphragm casing; a movable diaphragm mounted thereon to form a chamber therewith; a jet-pipe mounted stationary relatively to said casing; a member mounted on said diaphragm to be movable therewith, said member having an orifice arranged to coact with said jet-pipe and a central bore connecting said orifice with the interior of the chamber; and a guiding stud mounted on the casing, said stud having longitudinal recess and engaging the central passage of said member.

15. Fluid pressure relay comprising, in combination, a diaphragm casing; a movable diaphragm mounted therein to form two chambers therewith; a jet-pipe mounted stationary relatively to said casing the jet issuing from said jet pipe being substantially parallel to said diaphragm; and a member mounted on said diaphragm to be movable transverse to said jet, said member having two orifices adjacent to each other and arranged to coact with said jet-pipe and passages connecting each orifice with a chamber.

ALFRED HOCHSCHULZ.